US005765139A

United States Patent [19]

Bondy

[11] Patent Number: 5,765,139

[45] Date of Patent: Jun. 9, 1998

[54] METHOD AND APPARATUS FOR TRANSFORMING A RESOURCE PLANNING DATA STRUCTURE INTO A SCHEDULING DATA STRUCTURE

[75] Inventor: Gregory Louis Bondy, Austin, Tex.

[73] Assignee: International Business Machines Corporation, Armonk, N.Y.

[21] Appl. No.: 641,309

[22] Filed: Apr. 30, 1996

[51] Int. Cl.$^6$ .................................................. G06F 17/60
[52] U.S. Cl. .................................... 705/8; 705/9; 705/3
[58] Field of Search .................................. 705/9, 8, 3

[56] References Cited

U.S. PATENT DOCUMENTS

| | | | |
|---|---|---|---|
| 4,942,527 | 7/1990 | Schumacher | 364/401 |
| 5,016,170 | 5/1991 | Pollalis et al. | 364/401 |
| 5,172,313 | 12/1992 | Schumacher | 364/401 |
| 5,255,181 | 10/1993 | Chapman et al. | 364/401 |
| 5,291,397 | 3/1994 | Powell | 364/402 |
| 5,381,332 | 1/1995 | Wood | 364/401 |
| 5,406,476 | 4/1995 | Deziel, Jr. et al. | 364/402 |
| 5,596,502 | 1/1997 | Koski et al. | 364/468.01 |

OTHER PUBLICATIONS

Tim pyron "entering scheduling requirements", Microsoft project 4 for window. pp. 131–146, 1994.

*Primary Examiner*—Kevin J. Teska
*Assistant Examiner*—Hani Mahmoud Kazimi
*Attorney, Agent, or Firm*—Richard A. Henkler; Andrew J. Dillon

[57] ABSTRACT

An apparatus and method for directing a computer system to transform a plurality of data in a planning data structure into a scheduling data structure. Each entry of the scheduling data structure has at least a start date, quantity, and duration. The method includes the steps of if the first data is a member of a cost group, setting the duration to 0 and the start date to a beginning of a month, if the first data is not a member of the cost group, determining if the first entry is new, if the first entry is new, retrieving a second data from the planning data structure, setting the quantity for the first entry in the scheduling data structure to the larger of the first data and the second data, if the first entry is at least as large as the second entry, setting the start date to a beginning of a month and the duration to approximately a month, if the first entry is smaller than the second entry, setting the start date to a date later than the beginning of the month and the duration to a value less than a month, and repeating the above steps for all the data.

1 Claim, 7 Drawing Sheets

| TYPE | INDEX | QUANTITY | STARTDATE | DURATION |
|---|---|---|---|---|
| engineer | 0 | 2.00 | 01/16/1995 | 17.41 |
| engineer | 1 | 1.00 | 3/1/1995 | 4.34 |
| contract | 0 | 100.00 | 2/1/1995 | 0 |
| contract | 1 | 500.00 | 4/1/1995 | 0 |
| contract | 2 | 1000.00 | 6/1/1995 | 0 |
| systems | 0 | 3.00 | 1/1/1995 | 26.07 |
| electricity | 0 | 50.00 | 1/1/1995 | 0 |
| electricity | 1 | 100.00 | 2/1/1995 | 0 |
| electricity | 2 | 150.00 | 3/1/1995 | 0 |
| electricity | 3 | 25.00 | 4/1/1995 | 0 |
| electricity | 4 | 125.00 | 5/1/1995 | 0 |
| electricity | 5 | 100.00 | 6/1/1995 | 0 |

FIG. 3

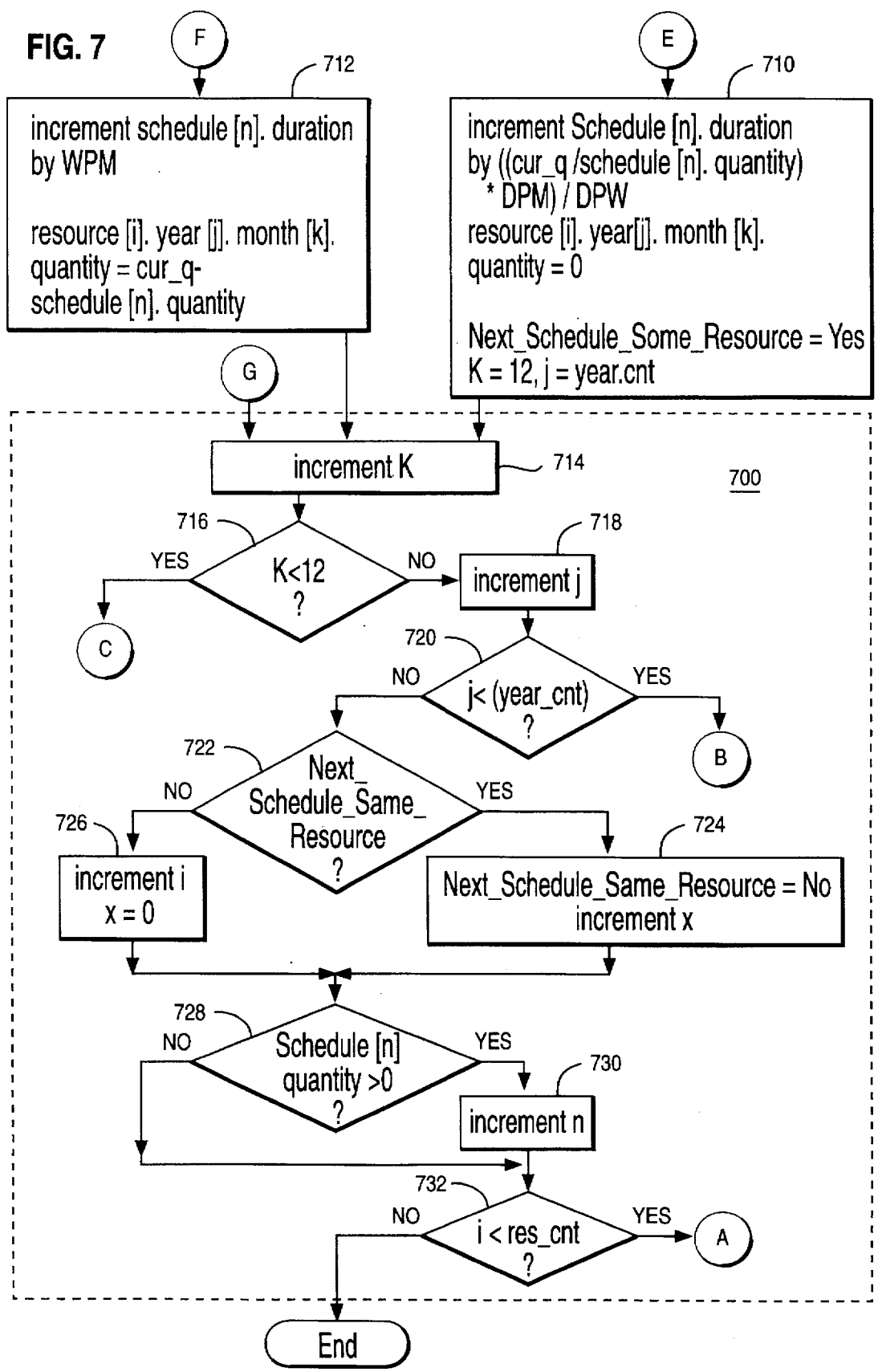

METHOD AND APPARATUS FOR TRANSFORMING A RESOURCE PLANNING DATA STRUCTURE INTO A SCHEDULING DATA STRUCTURE

BACKGROUND OF THE INVENTION

1. Field of the Invention

The present invention relates to transitioning from a planning phase to an implementation phase in project management and, more particularly, but without limitation, to a technique that causes a planning tool to also function as a scheduling tool.

2. Background Information and Description of the Related Art

Conventional planning tools chart quantities of resources against time using a "planning" data structure. For example, referring to FIG. 2, conventional three-dimensional planning data structure 200 includes multiple columns for displaying months 210, multiple rows for displaying various groups and sub-groups of resources 212, and multiple rows in the z domain for displaying years 214. Groups could include labor, cost, and material, while sub-groups could include contracts, systems, electricity, and engineers. The values within data structure 200 illustrate a quantity, which could be, for example, units of people for labor or dollars for cost, for a particular resource during a specific month and year. Therefore, in the uppermost left position (i.e., 0, 0, 0), the number "1" (see cell 216) represents one quantity of engineers in the group labor for January, 1995. Accordingly, a quantity for a particular resource 212, month 210, and year 214 can be stored in planning data structure 200. Planning data structure 200 can be defined using any suitable computer programming language, such as, for example:

```
struct { char type [10];
    char group[10];
    struct {
        struct { double quantity;
        } month[12];
    } year[LAST_YEAR - FIRST_YEAR + 1];
} resource[res_cnt];
```

In this example, FIRST_YEAR=1995 and LAST_YEAR=1997.

Conversely, conventional scheduling tools, such as Digital Tools' Auto PLAN II, Microsoft's Project and Computer Associates' Superproject, use a scheduling data structure that relies on a constant quantity over a given duration to represent resource allocation (i.e., duration driven scheduling). Specifically, referring to FIG. 3, scheduling data structure 300 represents each line of information using a type (i.e., sub-group), index of that type, quantity, start date, and duration in weeks. For example, the scheduling tool could represent 2 units of labor (i.e., quantity) to start Jan. 16, 1995 (i.e., start date) for 17.41 weeks (i.e., duration). Scheduling data structure 300 can be defined using any suitable computer programming language, such as, for example,:

```
struct { char type[10];
    int index;
    double quantity;
    char startdate[10];
    double duration;
} schedule[m];
```

The above described conventional scheduling data structure 300 dictates that a constant unit of quantity (e.g., 2 laborers) must be contiguous over the duration. This is completely opposite from planning data structure 200, where the three dimensional array may contain multiple units of quantity that do not have to be contiguous, e.g., empty spaces may exist between units of quantity.

Project managers often manually transform the data entered into the planning data structure 200 to the appropriate format for use in the conventional scheduling data structure 300. To do so, the project manager must manually re-format the data in the planning data structure 200 to conform with the rules of the above-described scheduling data structure 300. However, this process is extremely tedious and time consuming.

Accordingly, there is a demand for a technique or apparatus that causes a computer system to perform unique steps that would automatically transform data entered into a planning data structure for use in a scheduling data structure. Essentially, this technique would create a unique planning-scheduling tool.

SUMMARY

An apparatus and method direct a computer system, having at least a processor, user controls, and memory, to transform a plurality of data (i.e., quantities) in a planning data structure into a scheduling data structure. Each entry of the scheduling data structure includes at least a start date, quantity, and duration.

The method includes the steps of if the first data (in a first cell) of the planning data structure is a member of a cost group, setting the duration to 0 and the start date to a beginning of a month, if the first data is not a member of the cost group, determining if the first entry is new, if the first entry is new, retrieving a second data from the planning data structure, setting the quantity for the first entry in the scheduling data structure to the larger of the first data and the second data, if the first entry is at least as large as the second entry, setting the start date to a beginning of a month and the duration to approximately a month, if the first entry is smaller than the second entry, setting the start date to a date later than the beginning of the month and the duration to a value less than a month, and repeating the above steps for all the data.

BRIEF DESCRIPTION OF THE DRAWINGS

FIG. 3 illustrates a conventional scheduling data structure.

FIG. 7 illustrates detailed logic in the form of a flow chart for transforming the data in a planning data structure for use in a scheduling data structure.

DETAILED DESCRIPTION OF THE PREFERRED EMBODIMENT

Figure 1:
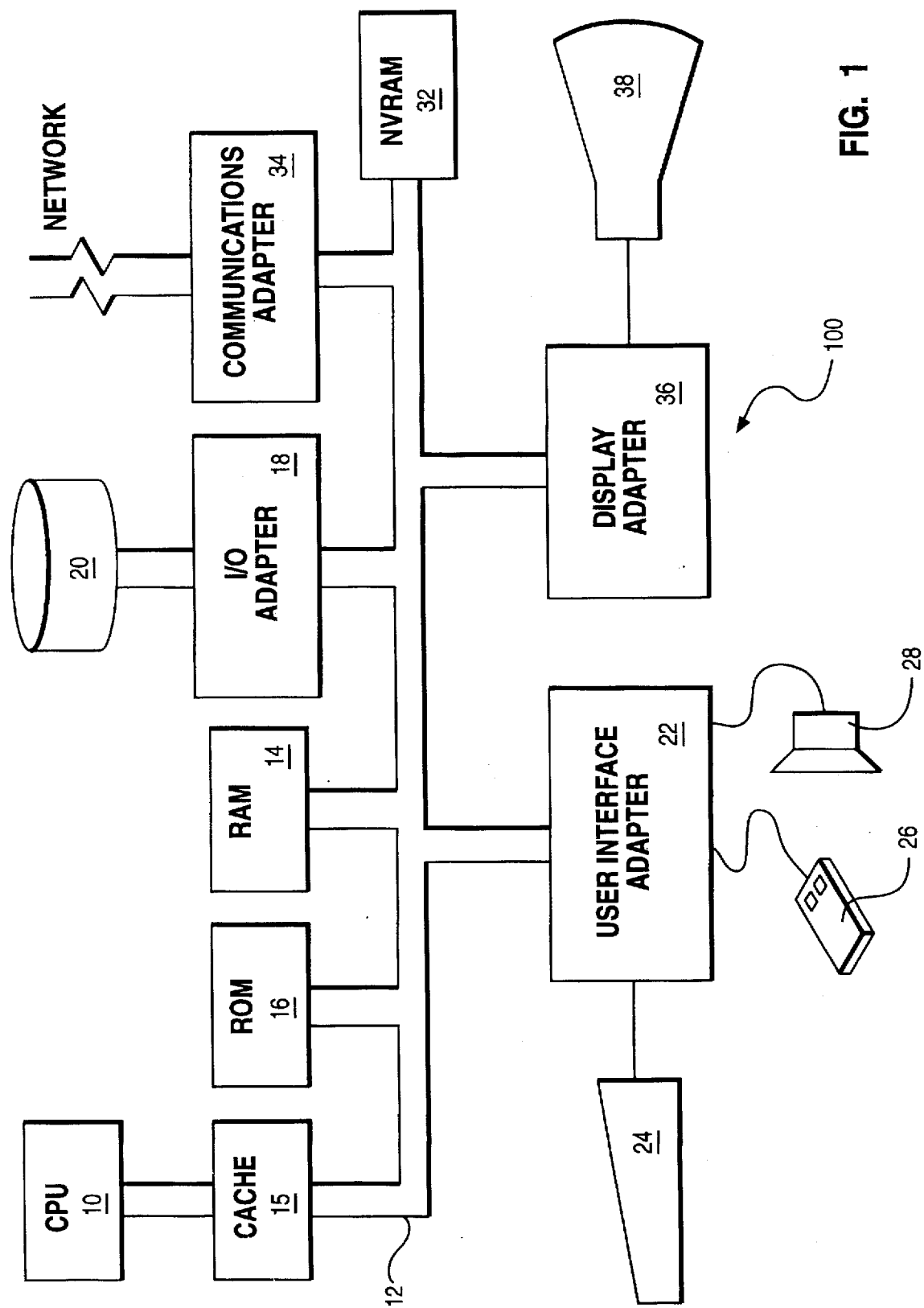
FIG. 1 is a schematic diagram of representative hardware for use with the present invention.

The present invention, in the form of an enhanced tool, may be practiced in any suitable hardware configuration, such as the hardware configuration illustrated in FIG. 1, or, alternatively, a laptop computer. Referring to FIG. 1, workstation 100 includes any suitable central processing unit 10, such as a conventional microprocessor (e.g., Intel's™ Pentium™ or IBM's™ PowerPC™), and a number of other units interconnected via system bus 12. Illustratively, workstation 100 includes random access memory ("RAM") 14, cache 15, non-volatile RAM 32, read only memory ("ROM") 16, display adapter 36 for connecting system bus 12 to display device 38, and I/O adapter 18 for connecting peripheral devices (e.g. disk and tape drives 20) to system bus 12. Workstation 100 further includes user interface adapter 22 for connecting keyboard 24, mouse 26, speaker 28, microphone 32, and/or other user interface devices, such as a touch screen device (not shown), to system bus 12. Communication adapter 34 connects workstation 100 to a data processing network.

The enhanced tool (herein tool), as computer readable program code, resides within a machine-readable media (e.g., memory) to direct the operation of workstation 100. Any suitable memory may retain the tool, such as RAM 14, ROM 16, a magnetic diskette (e.g., floppy diskette), CD-ROM, magnetic tape, or optical disk (the last four being located in disk and tape drives 20). Moreover, the tool may operate with any suitable operating system, such as IBM's AIX operating system. While the specification describes the tool as performing the features of the invention, in actuality, the tool merely provides the instructions for the central processing unit to perform those features.

Figure 2:
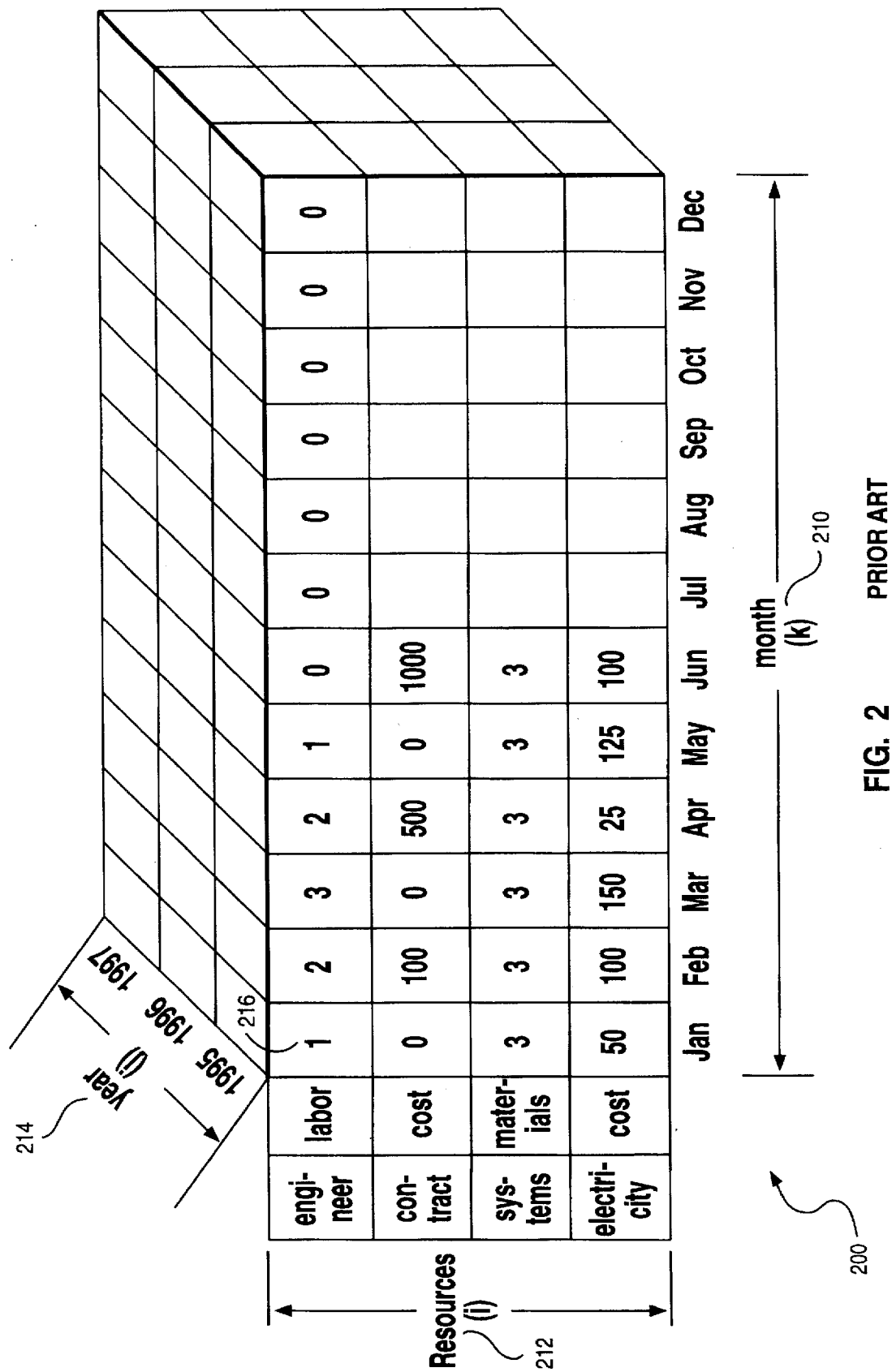
FIG. 2 illustrates a conventional three dimensional planning data structure.

As previously described in the background section and in FIG. 2, the planning data structure 200 for a three dimensional array, having three indices—resource, year, month, and data representing a set of quantities for a particular resource type and group, is defined using any suitable computer programming language:

```
struct { char type [10];
    chargroup[10];
    struct {
        struct { double quantity;
        } month[12]
    } year[LAST_YEAR - FIRST_YEAR + 1];
} resource[res_cnt];
``` where res_cnt represents the resource count. Individuals skilled in the computer art could implement the above code in their language of choice. As an example, referring to FIG. 2, the resource (engineer) would be referenced as resource [0].type="engineer", resource[0].group="labor", and the quantity for that resource in March, 1995 would be represented as: resource [0].year[0].month[3].quantity=3. As noted, each cell represents the quantity of a particular resource for a particular month within a particular year.

Similarly, the scheduling data structure 300 (see FIG. 3) is represented as:

```
struct { char type[10];
    int index;
    double quantity;
    char startdate[10];
    double duration;
} schedule [max_sched_cnt];
``` where max_sched_cnt is the number of entries and duration is in weeks. Therefore, as an example, the first elements of schedule data structure 300 shown in FIG. 3 would be referenced as:

schedule [0].type=engineer
schedule [0] index=0
schedule [0].quantity=2.0
schedule [0].startdate="Jan. 16, 1995"
schedule [0].duration=17.41

FIGS. 4, 5, 6 and 7 illustrate detailed logic in the form of a flow chart for defining a tool that transforms data in a planning data structure for use in a scheduling data structure. As an example, FIG. 2 illustrates planning data structure 200 containing data that will be automatically transformed by the tool into the data presented in scheduling data structure 300 shown in FIG. 3. Therefore, FIGS. 2–7 will be used in conjunction to explain the following example.

In addition to the data provided in FIG. 2, several other variables must be defined before the tool can begin transforming the data. Some of these variables are user defined, while others are fixed:

| | |
|---|---|
| FIRST_YEAR = 1995 | /* User defined*/ |
| LAST_YEAR = 1997 | /* User defined*/ |
| res_cnt = 4 | /* User defined*/ |
| max_sched_cnt = 1000 | /* User defined*/ |
| WPM (weeks per month) = 4.345238 | /* Fixed*/ |
| DPM (days per month) = 30.41666 | /* Fixed*/ |
| DPW (days per week) = 7 | /* Fixed*/ |

All duration calculations for this tool are done in weeks, using the fixed values above. The value of a month in this tool is fixed as defined to make calculations consistent month to month.

Tool Initialization

Figure 4:
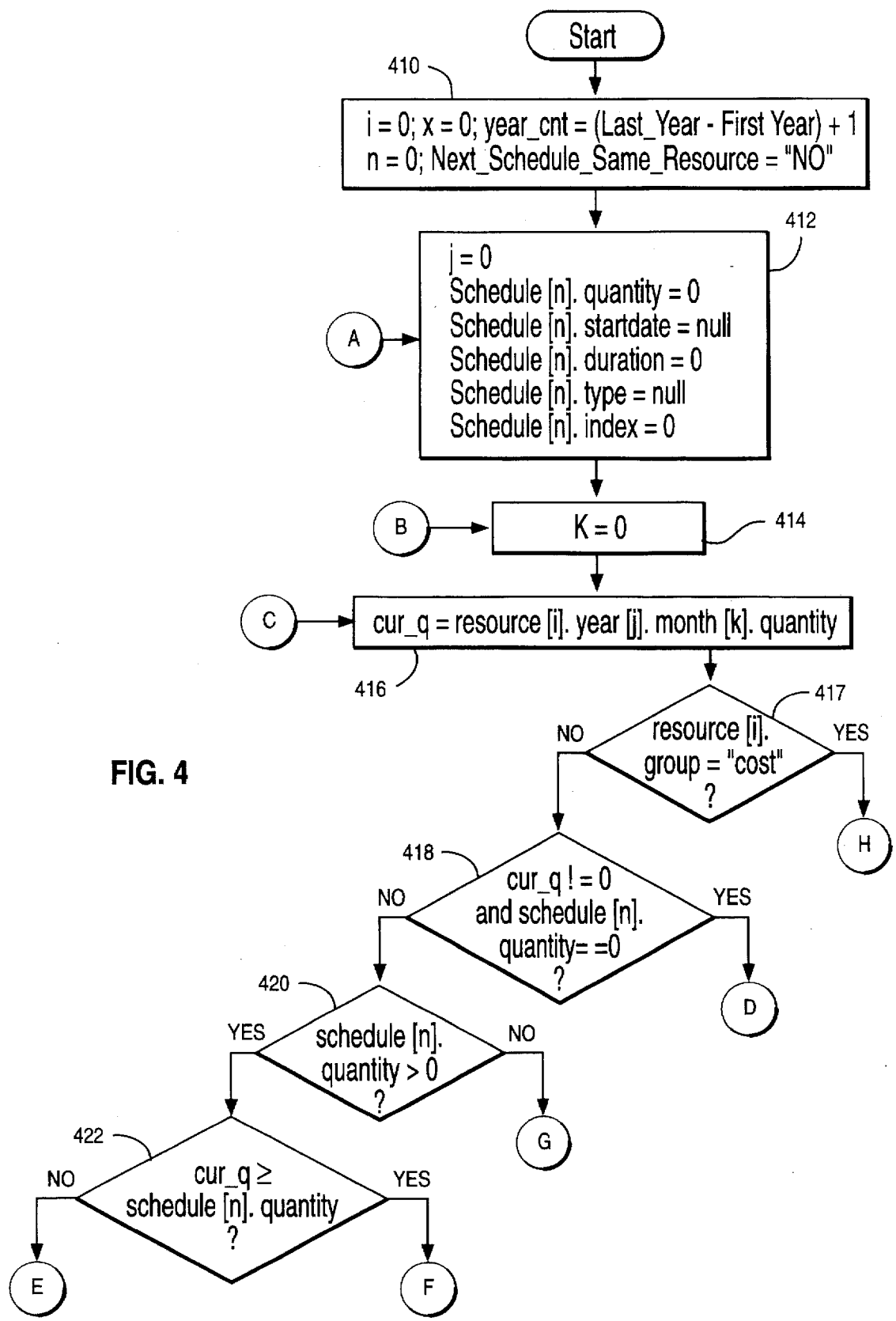
FIG. 4 illustrates detailed logic in the form of a flow chart for transforming the data in a planning data structure for use in a scheduling data structure.

Referring to FIG. 4, block 400 includes initialization steps. At 410, the tool initializes the variables "i", "n" and "x" to 0, assigns year_cnt equal to (LAST_YEAR–FIRST_YEAR)+1, and initializes NEXT_SCHEDULE_SAME_RESOURCE equal to "NO". The tool uses "i" to move to the next resource in planning data structure 200, "n" to define the count/entry of scheduling data structure 300 (i.e., schedule[n]), and "x" to uniquely identify resources of the same type in scheduling data structure 300. At 412, the tool initializes the first entry of scheduling data structure 300 (i.e., schedule[0] first line in FIG. 3) to zero (or null) and initializes the year index "j", which is used to increment the year, to zero. At 414, the tool initializes the month index "k", which is used to increment the month, to zero. At 416, the tool assigns the current quantity "cur_q", which is merely a variable used for holding the current quantity retrieved/extracted from the planning data structure 200, to the first quantity stored in the upper, left most cell of the planning data structure 200 shown in FIG. 2 (e.g., cell 216). Therefore, in this example, the tool assigns cur_q to "1". At this point, the tool has completed the initialization of all variables and scheduling data structure 300.

Determining the Resource Group

At 417, the tool determines if the resource type (also referred to as sub-group) is a member of the group "cost" (referenced by resource [i].group). The group " cost" must be treated differently from other groups because it represents a dollar expense that is paid at a single point in time rather than spread over time. In this example, resource [0].group= labor, which is not "cost". If not in the group "cost", control is directed to 418 (described herein). If in the group "cost", control is directed to 510 of FIG. 5.

Process Quantity from Resource in "Cost" Group

Figure 5:
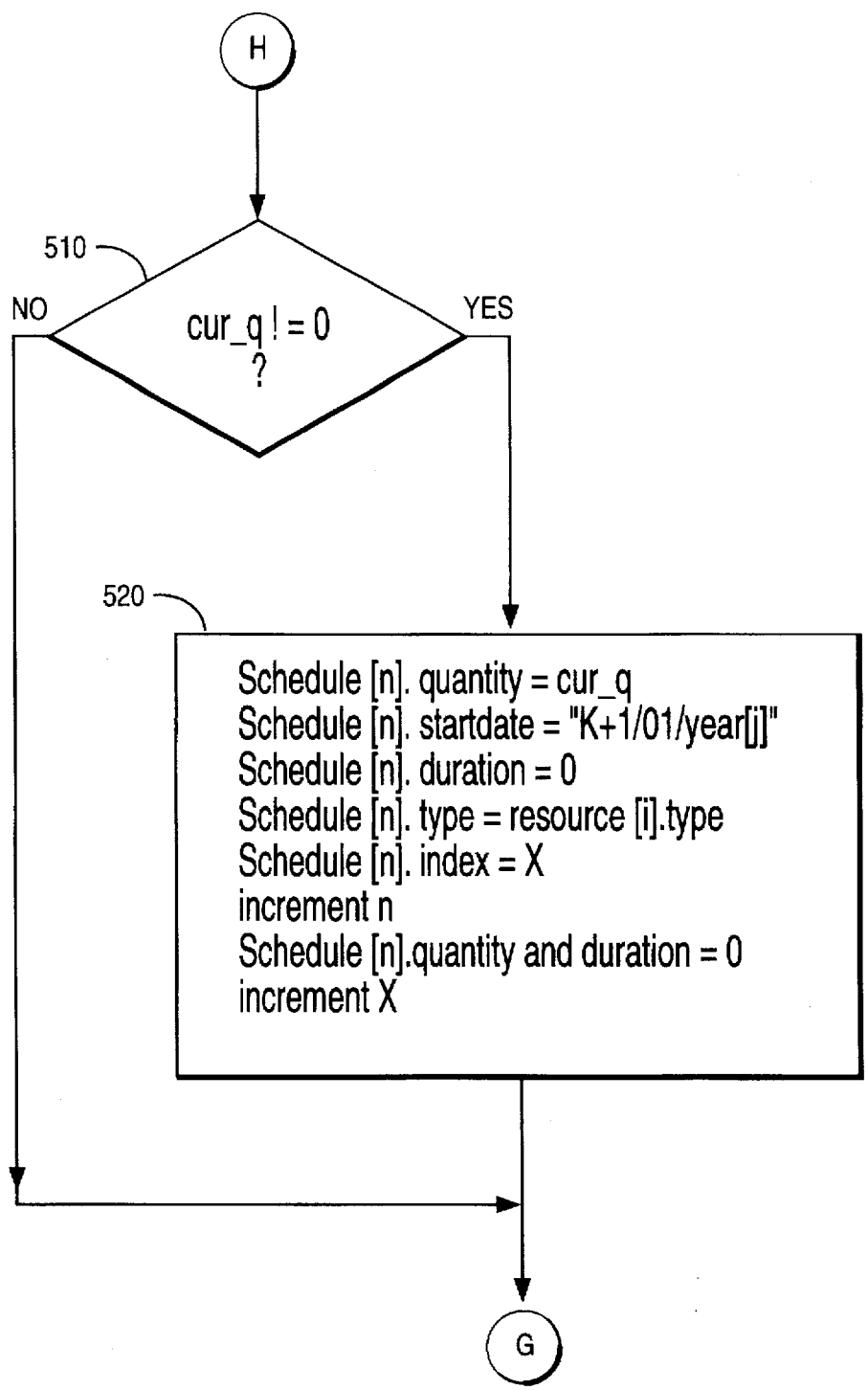
FIG. 5 illustrates detailed logic in the form of a flow chart for transforming the data in a planning data structure for use in a scheduling data structure.

Referring to FIG. 5, at 510, the tool determines if cur_q is not equal to zero. If cur_q equals zero, then there is no data to transform. Therefore, control is directed to 714 of FIG. 7 so that the tool can move to a new cell (e.g., new resource, month, and/or year) (described herein). If cur_q does not equal zero, then there is a quantity to be transformed and, therefore, at 520, the tool creates a schedule entry for the current quantity cur_q retrieved from the planning data structure 200. The tool assigns the schedule type (schedule [n].type) from the resource type (resource [i].type). The index x will start at 0 and will be incremented for each schedule entry of a particular resource (e.g., see 310 and 312 in FIG. 3). Because this resource represents a dollar expense that is paid at a single point in time rather than spread over time, the start date is always fixed at the first day of the current month and the duration is set to 0. Control is directed to 714 of FIG. 7 (described herein) Process "Labor" and "Material" Groups Returning to FIG. 4, as a result of 417, the resource group will either be "labor" or "material". At 418, the tool logically determines if it has reached the start of a new schedule entry by determining if cur_q is not equal to 0 and schedule [n].quantity is 0. If both conditions are satisfied, the tool has reached the start of a new schedule entry and, therefore, the tool directs control to 610 of FIG. 6 to set the quantity and start date of a new "non-cost" schedule entry. If both conditions are not satisfied, either the current cell does not have data to transform or the tool is currently calculating the duration for an existing schedule entry, and control is directed to 420 (described herein).

Start a New Non-Cost Schedule Entry

Figure 6:
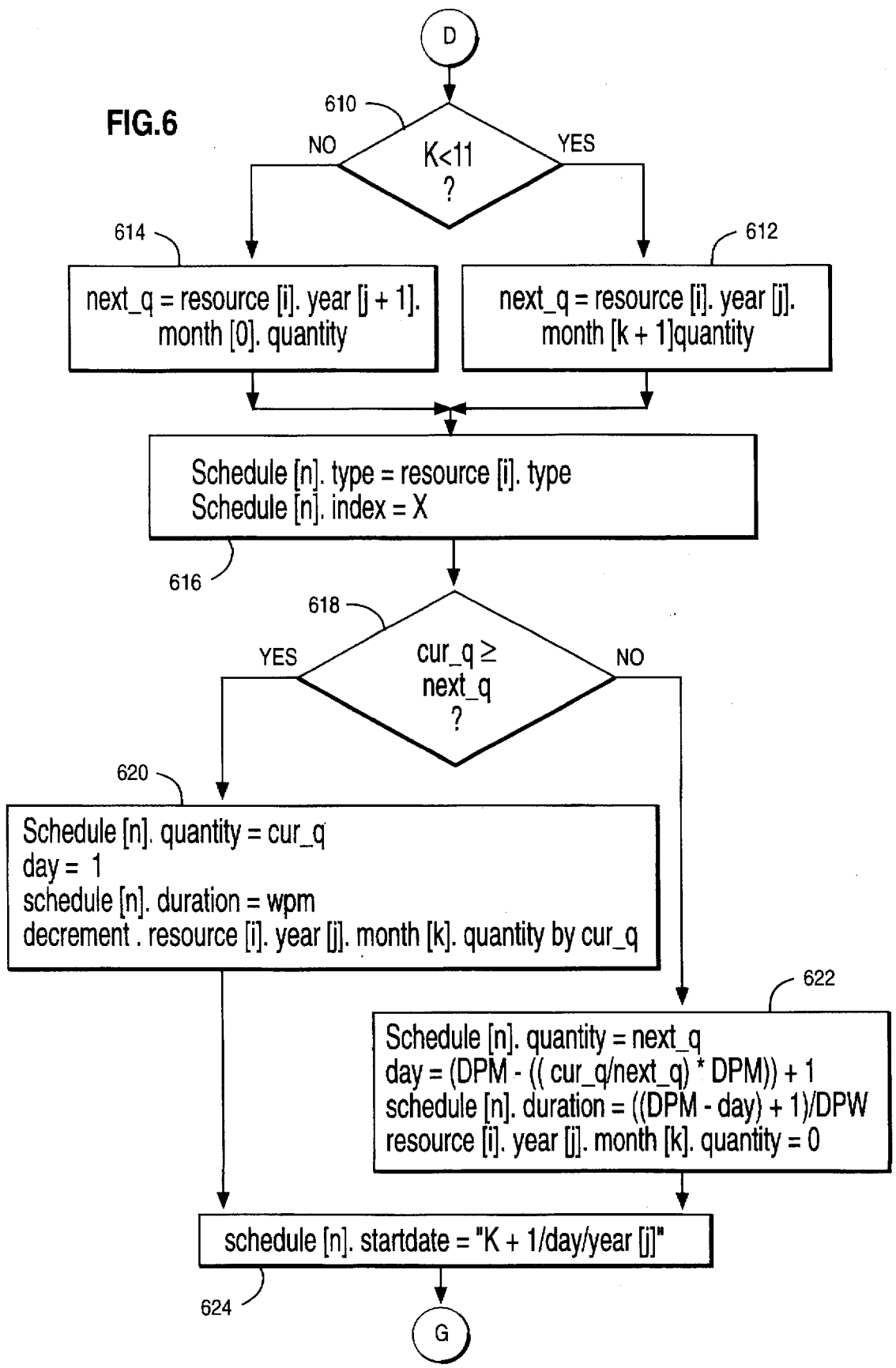
FIG. 6 illustrates detailed logic in the form of a flow chart for transforming the data in a planning data structure for use in a scheduling data structure.

Referring to FIG. 6, to tool determines which cell in planning data structure 200 to retrieve the next quantity "next_q", which merely holds the quantity of the next cell. To do so, at 610, the tool determines if the month index "k" is less than 11. If k is less than 11, indicating that the end of year has not been reached, at 612, the tool retrieves/extracts the next quantity "next_q" from resource [i].year[j].month [k+1].quantity and control is directed to 616. If k is not less than 11, indicating that the end of the year has been reached, the quantity should be extracted from the beginning of the next year, and control is directed to 614 where the tool assigns next_q from resource [i].year[j+1].month [0].quantity.

At 616, the tool assigns schedule [n].type from resource [i].type. The tools assigns the index "schedule [n].index" from x. For the first pass of a new resource, x will be 0. For each subsequent schedule entry for the same resource, the tool increments x by 1. At 618, the tool determines the quantity for the schedule entry by comparing the current quantity "cur_q" with the next quantity "next_q" and using the larger of the two as the schedule quantity (schedule [n].quantity). Accordingly, if cur_q is greater than or equal to next_q, control is directed to 620. If cur_q is less than next_q, control is directed to 622.

At 620, the tool assigns schedule [n].quantity to cur_q because cur_q is at least as large as next_q and, therefore, can be applied for an entire month.

Therefore, the tools assigns the day portion of the start date equal to 1, schedule [n].duration to WPM (i.e., an entire month), and decrements resource [i].year [j].month [k].quantity by cur_q, indicating that the current quantity has been transformed into the scheduling data structure 300. Therefore, the tool must eliminate that current quantity cur_q from the planning data structure 200 so that it will not be retransformed during another pass. Control is directed to 624.

Because next_q was larger than cur_q, at 622, the tool assigns schedule [n].quantity to next_q, thereby potentially reducing the number of schedule entries for a given resource. To do so, the tool sets the duration (in weeks) to a value less than a full month and the start date to a date later than the beginning of a month. Accordingly, the tool assigns the day portion of the start date equal to (DPM−((cur_q_/next_q) * DPM))+1, schedule [n].duration equal to ((DPM−day)+1)/DPM (in weeks), and resource [i].year [j].month [k].quantity to 0. Control is directed to 624.

At 624, the tool assigns schedule [n].startdate to "k +1/day/year [j]". Control is directed to 714 of FIG. 7 (described herein).

Returning to FIG. 4, at 418, if cur_q is equal to 0 or schedule [n].quantity is not 0, signifying that either the current cell does not have data (i.e., a quantity) to process or that the tool is currently calculating the duration in weeks for an existing schedule entry, at 420, the tool determines if a duration calculation needs to be performed by determining if schedule [n].quantity is greater than 0. If not greater than 0, indicating that the tool points to a null entry in the scheduling data structure 300 and, therefore, that the tool should proceed to the next cell, control is directed to 714 of FIG. 7 (described herein). If greater than 0, at 422, the tool determines the required duration calculation by comparing the current quantity cur_q with the schedule quantity schedule [n].quantity to determine if the duration is a fractional portion of a month. If cur_q is greater than or equal to schedule [n].quantity, indicating the duration is a full month, control is directed to 712 of FIG. 7 to increment the duration by a month. If cur_q is less than schedule [n].quantity, indicating the duration is a fractional portion of a month, control is directed to 710 of FIG. 7.

Duration Calculation

Referring to FIG. 7, at 712, because cur_q is greater than or equal to schedule [n].quantity, the tool adds an entire month to the duration (i.e., adds WPM to schedule [n].duration. Next, the tool decrements the quantity in planning data structure 200 (i.e., resource [i].year [j].month [k].quantity) by the difference between the current quantity and the schedule quantity (i.e., cur_q−schedule [n].quantity). Control is directed to 714.

At 710, because the tool is processing a fractional part of a month, the tool increments the duration of scheduling data structure 300 (i.e., schedule [n].duration) by the ratio of cur_q and schedule [n].quantity (i.e., ((cur_q/schedule [n].quantity) * DPM) / DPW). Because cur_q was less than schedule [n].quantity (determined at step 422), the tool sets the quantity of planning data structure 200 (i.e., resource [i].year [j].month [k].quantity) to zero because the tool is at the end of the schedule entry. However, because there is potentially another schedule entry for the same resource, the tool assigns NEXT_SCHEDULE_SAME_RESOURCE to Yes, and sets the month and year indices (i.e., assigns k to 12 and j to year_cnt) so that the process will restart at the beginning of the row at cell resource [i].year [0].month [0].quantity. Control is directed to 714.

Adjust Positioning in Data Structure

Essentially, in block 700, the tool moves from one cell to the next in planning data structure 200. At 714, the tool increments k by 1 to eventually advance the month. At 716, the tool determines if k is less than 12. If so, control is directed to 416 of FIG. 4 where a new current quantity cur_q is retrieved/extracted. If not, at 718, the tool increments j by 1 to eventually advance the year. At 720, the tool determines if the end of the last year has been reached (i.e., if j is less than year_cnt). If j is less than year_cnt, control is directed to 414 of FIG. 4, where the month index K is set to 0. If j is greater than or equal to year_cnt, indicating that the tool has reached the last month of the last year, at 722, the tool makes a determination if another pass should be made for the current resource by examining the setting of the flag "NEXT_SCHEDULE_SAME_RESOURCE". If set to Yes, indicating the next pass if for the same resource, at 724, the tools re-sets the flag to NO, increments the schedule index x to ensure a unique index for each schedule type, and directs control to 728.

If "NEXT_SCHEDULE_SAME_RESOURCE" is NO, at 726, the tool increments i by 1 and sets x to 0 so that data transformation can start at the beginning of the next resource. At 728, the tool examines the schedule [n].quantity to determine if its a null entry. If it is greater than 0, indicating it is not null, at 730, the tool increments the index n in the scheduling data structure to point to the next schedule entry. If not greater than 0, control is directed to 732. At 732, the tool determines if there are more resources to process by determining if resource index "i" is less than res_cnt. If not, control returns to 412 of FIG. 4. If so, the transformation is complete and processing ends.

The result in executing this tool repeatedly for all resources in the planning data structure 200 of FIG. 2 produces the schedule data structure shown in FIG. 3. Illustratively, for the resource called engineer in FIG. 2, the planning data structure would be represented as:

resource [0].group=labor
resource [0].type engineer
resource [0].year [0].month [0].quantity=1
resource [0].year [0].month [1].quantity=2
resource [0].year [0].month [2].quantity=3
resource [0].year [0].month [3].quantity=2
resource [0].year [].month [4].quantity=1

The tool transforms this same data in the scheduling data structure and represents it as:

schedule [0].type=engineer
schedule [0] index=0
schedule [0].quantity=2.00
schedule [0].startdate="Jan. 16, 1995"
schedule [0].duration=17.41
schedule [1] type=engineer
schedule [0] index=1
schedule [0].quantity=1.00
schedule [0].startdate="Mar. 1, 1995"
schedule [0].duration=4.34

While the invention has been shown and described with reference to particular embodiments thereof, it will be understood by those skilled in the art that the foregoing and other changes in form and detail may be made therein without departing from the spirit and scope of the invention, which is defined only by the following claims. For example, the above preferred embodiment could be modified to encompass effort and resource driven scheduling.

I claim:

1. A method for directing a computer system to transform a plurality of data in a planning data structure into a scheduling data structure, each entry of the scheduling data structure having at least a start date, quantity, and duration, comprising the steps of:

if the first data is a member of a cost group, setting the duration to 0 and the start date to a beginning of a month;

if the first data is not a member of the cost group, determining if the first entry is new;

if the first entry is new, retrieving a second data from the planning data structure;

setting the quantity for the first entry in the scheduling data structure to the larger of the first data and the second data;

if the first entry is at least as large as the second entry, setting the start date to a beginning of a month and the duration to approximately a month;

if the first entry is smaller than the second entry, setting the start date to a date later than the beginning of the month and the duration to a value less than a month; and repeating the above steps for all data.

* * * * *